Nov. 24, 1964    P. J. B. LACOMME ETAL    3,158,677
WIDE ANGLE OCULARS
Filed Dec. 19, 1960                    2 Sheets-Sheet 1
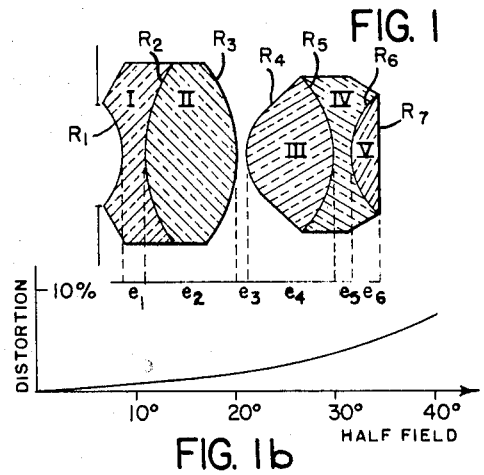
FIG. 1
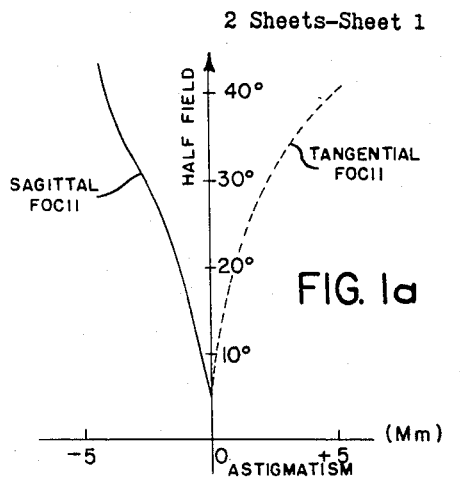
FIG. 1a
FIG. 1b
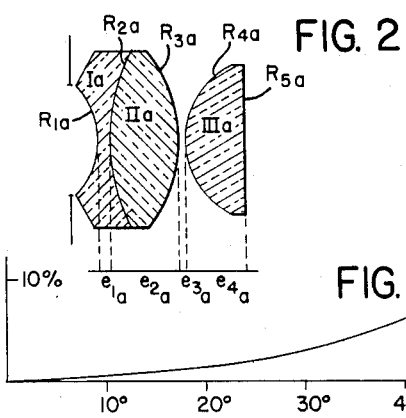
FIG. 2
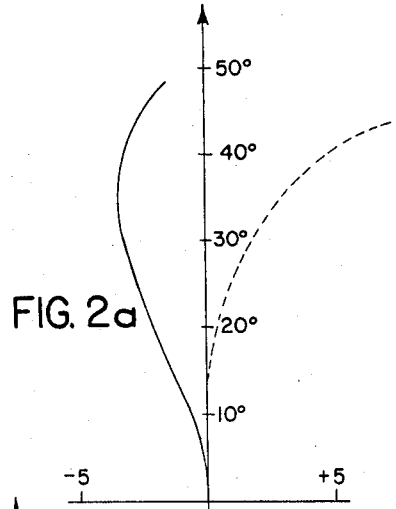
FIG. 2a
FIG. 2b
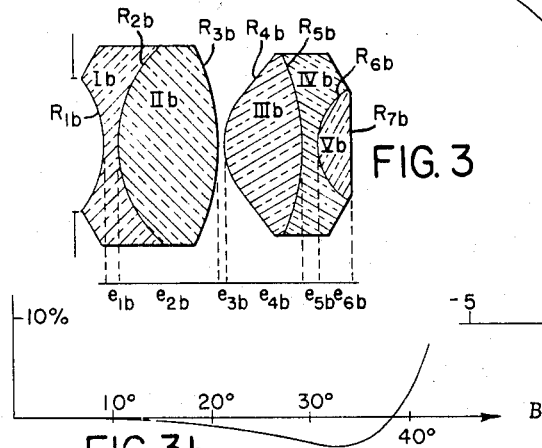
FIG. 3
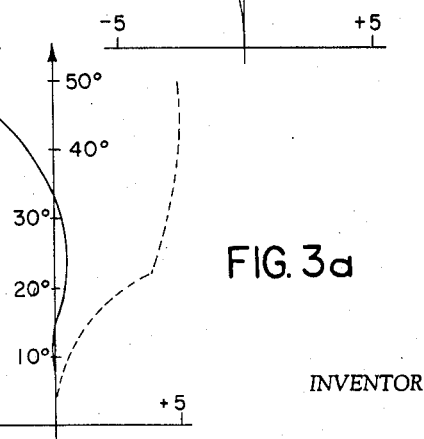
FIG. 3a
FIG. 3b
INVENTOR
PIERRE J. B. LACOMME
JEAN L. DEMARCQ
BY Samuel L. Davidson ATTORNEY Nov. 24, 1964   P. J. B. LACOMME ETAL   3,158,677
WIDE ANGLE OCULARS
Filed Dec. 19, 1960   2 Sheets-Sheet 2

INVENTOR
PIERRE J.B. LACOMME
JEAN L. DEMARCQ
BY Samuel L. Davidson
ATTORNEY

United States Patent Office
3,158,677
Patented Nov. 24, 1964

3,158,677
WIDE ANGLE OCULARS
Pierre J. B. Lacomme, 4 Rue Francois Mouthon, Paris, France, and Jean L. Demarcq, 10 Rue Vaillant, Vigny, Seine-et-Oise, France
Filed Dec. 19, 1960, Ser. No. 76,624
6 Claims. (Cl. 88—57)

The present invention relates to oculars, or eye pieces for optical instruments, and more particularly to an improved ocular with a wide apparent field having reduced marginal astigmatism or other distortions.

Among the various types of oculars of wide apparent field, the following two types can be distinguished:

(1) Oculars all of whose surfaces are spherical. Such oculars generally comprise a large number of air elements, and the entry lens, that is, the lens facing the objective of the telescope, is often divergent, so as to reduce by Petzval's factor the astigmatism at the edges of the field. (It will be recalled that Petzval's factor is defined by the expression $$\Sigma = \frac{\phi}{\eta}$$

wherein $\phi$ and $\eta$ respectively stand for the inverse of the focal length and the index of refraction of each of the refringent elements constituting the optical system.)

(2) Oculars which use aspherical surfaces. Generally, it suffices to associate two groups of lenses into an assembly comprising only one aspherical surface such as a paraboloid of revolution, the shape of the said surface making it possible to reduce the angle of incidence of the image-forming light rays at the edges of the field and at the same time facilitating the correction of astigmatism and distortion.

The present state of the art permits the production of so-called "parabolic" surfaces with satisfactory precision, and many wide-field prismatic binoculars are equipped with parabolic" oculars whose apparent field amounts to 90°. Nevertheless, the marginal astigmatism of such systems is sometimes disappointing.

In comparison with these systems, the present invention aims at creating a wide apparent-field convergent ocular wherein the marginal astigmatism is to a great measure reduced. Another aim of the invention is to define the profiles of the surfaces of the wide field ocular by algebraic equations. Another aim of the invention is to associate the convergent ocular with an appropriate objective to obtain an optical instrument such as a prism binocular or a telescopic gunsight permitting the observation of remote objects. Other aims and advantages will appear from the annexed description and from the drawings enumerated below. The novel features that are considered characteristic of the invention are set forth with particularity in the appended claims.

Some optical devices according to the invention are represented by way of example in the annexed drawings, wherein like reference characters indicate like parts throughout the several figures and in which:

FIGURE 1 represents a view in axial cross-section of a convergent achromatic ocular comprising five elements, the magnification being equal to 8.

FIGURES 1a and 1b represent the curves of astigmatism and of distortion of the above ocular, respectively.

FIGURE 2 represents a view in axial cross-section of a convergent ocular comprising three elements, the magnification being equal to 8.

FIGURES 2a and 2b represent respectively the astigmatism and distortion curves of the above ocular.

FIGURE 3 represents a view in axial cross-section of a convergent ocular comprising five elements, the magnification being equal to 18.

FIGURES 3a and 3b represent respectively the astigmatism and distortion curves of the above ocular.

Figure 4:
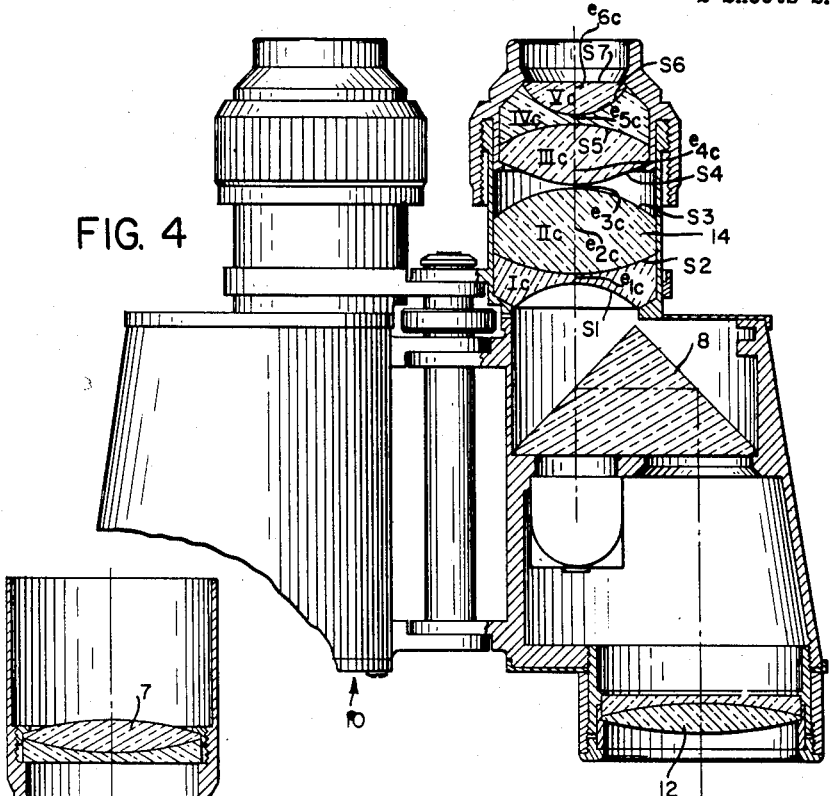
FIGURE 4 is an elevational view partially in axial cross-section of a binocular instrument incorporating an ocular according to the invention.

In FIGURE 1, an ocular has been represented comprising five elements, I, II, III, IV and V, of which elements I and II constitute the field lens of the ocular and elements III, IV and V the eye lens. It will be noted that, in this figure, the outside surfaces of the field lens have their concavity orientated towards the objective situated to the left, but not shown. The radii of curvature of the different surfaces are designated by $R_1$, $R_2$, $R_3$, $R_4$, $R_5$, $R_6$ and $R_7$. The thicknesses on the axis of the various refringent media are designated as $e_1$, $e_2$, $e_3$, $e_4$, $e_5$ and $e_6$.

If, as it is customary, the geometric magnitudes are expressed as a unit of length equal to one hundredth of the focal length of the ocular, the following tables may be drawn up:

TABLE I

Radii of Curvature

| $R_1$ | $R_2$ | $R_3$ | $R_4$ | $R_5$ | $R_6$ | $R_7$ |
|---|---|---|---|---|---|---|
| −133.7 | 267.4 | −186.0 | 103.4 | −209.3 | 93.0 | ∞ |

TABLE I'

Thicknesses

| $e_1$ | $e_2$ | $e_3$ | $e$ | $e_5$ | $e_6$ |
|---|---|---|---|---|---|
| 11.6 | 123.3 | 2.46 | 89.5 | 11.6 | 46.4 |

For each of the elements I, II, III, IV and V constituting the ocular, the index of refraction $\eta_D$ and Abbe's number $\mu$, representing the dispersive power, are given by the following table:

TABLE I''

Glass

|  | $n_D$ | $\nu$ |
|---|---|---|
| I | 1.62221 | 36 |
| II | 1.69054 | 54 |
| III | 1.69054 | 54 |
| IV | 1.69300 | 31 |
| V | 1.69054 | 54 |

All the surfaces of the ocular in question are spherical except the front surface $R_4$ of the rear group of elements. The equations of the meridian of this surface are:

$$x = \frac{y^2}{206.8} \text{ when } 0 < y < 50$$

$$x = \frac{y^2}{206.8} + 10^{-8}(y-50)^4 \text{ when } y > 50$$

wherein $x$ and $y$ are expressed in millimeters.

According to FIGURE 1a, the respective positions of the sagittal and tangential foci in relation to the focal plane of the ocular have been placed on the X-axis, the distances being expressed in millimeters. The Y-axis shows the half-field values expressed in sexagesimal degrees. The solid curve relates to the sagittal focus, and the broken curve relates to the tangential focus.

FIG. 1b shows the curve of distortion of the same ocular, with the half-field values, expressed in sexagesimal degrees, located on the X-axis, and the rate of distortion located on the Y-axis, the latter being positive for barrel distortion, according to the accepted conventions.

The following is a theoretical exposition which makes it possible in general to design convergent oculars according to the invention, particularly those represented in FIGURES 1, 1a and 1b.

In the designing of surface profiles making it possible to reduce, to a great extent, the marginal astigmatism of wide-field oculars, the said surface profiles differ essentially from those presently used in their external portions, which can be made to co-operate with a central, or inner, portion constituted, for example, by a surface of revolution of the 2nd degree, such as a paraboloid of revolution.

The theoretical study of questions of field curvature makes it possible to show that Petzval's equation is valid only if the analytical expression of the meridian of the refractive surface is continuous, and so are its successive derivatives, these conditions being satisfied in the case of algebraic surfaces. However, experience shows that the optical qualities of a refractive surface are principally dependent on the continuity of the surface itself, and on the continuity of the first and second derivatives. This being the case, according to the invention, we shall take a meridian profile defined by the following system of equations:

$$x = f(y) \text{ when } 0 < y < y^0$$

$$x = f(y) + \epsilon(y-y^0)^\alpha \text{ when } y^0 < y$$

wherein $f(y)$ represents a continuous function admitting continuous derivatives; $\epsilon$ represents a numerical coefficient, and $\alpha$ a positive number equal to or greater than 3.

In particular, $f(y)$ can be taken to be a function of the 2nd degree representing a parabola or hyperbola tangent at its summit 0 to $0x$, that is to say, one or the other of the following functions:

$$x = ay^2$$
$$x = \sqrt{ay^2 + b^2} - b$$

The surface of revolution whose meridian can be represented analytically by the above system of equations will constitute the internal surface of the eye glass of the ocular, that is, the surface facing the field lens. The presence of such a surface makes it possible to reduce the marginal distortion of a wide apparent field ocular by an amount that may excel 20%.

The optical system in FIGS. 1, 1a and 1b comprises a particular construction of the field section of the ocular, which is constituted, according to the invention, by a group of cemented lenses externally bounded by two surfaces of concavity directed towards the objective and being such that the total thickness of the group and the radii of curvature of the said surfaces are of the same order of magnitude as the focal length $f$ of the ocular. More precisely, the total thickness will be between $0.7f$ and $1.6f$. Referring to Table I above, it will be noted that the total thickness of the field section, $e_1 + e_2 = 134.9$. As for the radii of curvature of the surfaces of entry (facing the objective) and of exit of the field section, the first will be between $1.3f$ and $2f$ and the second between $1.5f$ and $2.3f$, according to the invention. Referring to Table I above, it will be seen that $R_1 = -133.7$ and $R_3 = -186.0$. Similar relations exist for the optical systems of FIGS. 2 and 3 as will appear hereinafter upon reference to the tables presented for these systems.

The astigmatism at the edges of the field can thus be reduced along with the Petzval sum, without increasing the number of air-to-glass surfaces, this being of benefit to the brightness of the ocular and serving for better elimination of reflections or of stray light.

As regards the practical production of the aspherical surfaces specified in the present application, any appropriate known process used in the field of the cutting and polishing of lenses can be applied.

In FIG. 2 an ocular has been represented with three elements, $Ia$, $IIa$ and $IIIa$, whose characteristic magnitudes (radii of curvature, thicknesses, indexes of refraction) have the values indicated in the following tables:

TABLE 2

Radii of Curvature

| $R_{1a}$ | $R_{2a}$ | $R_{3a}$ | $R_{4a}$ | $R_{5a}$ |
|---|---|---|---|---|
| −139.7 | 465.8 | −174.7 | 100.9 | ∞ |

TABLE 2'

Thickness

| $e_{1a}$ | $e_{2a}$ | $e_{3a}$ | $e_{4a}$ |
|---|---|---|---|
| 11.6 | 116.4 | 2.3 | 47.69 |

TABLE 2''

Glass

|  | $n_D$ |
|---|---|
| $Ia$ | 1.620 |
| $IIa$ | 1.690 |
| $IIIa$ | 1.690 |

As in the case of Ocular 1, the only aspherical surface is the inside surface of the eye section, the meridian of which has the following equations:

$$x = \frac{y^2}{201.8} \text{ when } 0 < y < 45.18$$

$$x = \frac{y^2}{201.8} + 1.2 \cdot 10^{-8}(y-45.18)^4 \text{ when } 45.18 < y$$

$x$ and $y$ being expressed in millimeters.

The ocular thus constructed is convergent, with magnification 8, and its curves of astigmatism and distortion are represented in FIGS. 2a and 2b, the co-ordinates having the same signification as in FIGS. 1a and 1b.

According to FIG. 3, an achromatic convergent ocular of 18× magnification has been showed in the same manner, the characteristics of the component elements being defined in the following tables:

TABLE 3

*Radii of Curvature*

| $R_{1b}$ | $R_{2b}$ | $R_{3b}$ | $R_{4b}$ | $R_{5b}$ | $R_{6b}$ | $R_{7b}$ |
|---|---|---|---|---|---|---|
| −143.6 | 230 | −210 | 115 | −230 | 143.6 | ∞ |

TABLE 3'

*Thickness*

| $e_{1b}$ | $e_{2b}$ | $e_{3b}$ | $e_{4b}$ | $e_{5b}$ | $e_{6b}$ |
|---|---|---|---|---|---|
| 10.3 | 126 | 1.1 | 126 | 12.6 | 40.0 |

TABLE 3''

*Glass*

| | $n_D$ | $\nu$ |
|---|---|---|
| Ib | 1.73757 | 28 |
| IIb | 1.80393 | 45 |
| IIIb | 1.80393 | 45 |
| IVb | 1.73757 | 28 |
| Vb | 1.69378 | 54 |

The inside surface of the eye glass is aspherical, and the equations of its meridian are:

$$x = \sqrt{2y^2 + 52900} - 230 \text{ when } 0 < y < 50$$

$$x = \sqrt{2y^2 + 52900} - 230 + 2.10^{-6}(y-50)^3 \text{ when } 50 < y$$

$x$ and $y$ being being expressed in millimeters.

FIGS. 3a and 3b represent the curves of astigmatism and distortion of the ocular thus defined.

Because of their wide apparent field, the oculars just described can be used in a large number of optical instruments such as wide-field prism binoculars, telescopic gunsights, microscopes, etc.

FIG. 4 gives an example of embodiment of the ocular of the invention to a 10×50 prism binocular 10. By way of non-limitative example, the constructional data on this ocular are the following: The objective lens 12 has a focal length of 180 mm. and diameter of 50 mm. Two Porro 2nd type 45° prisms 8 (hypotenuses 65 and 45 mm., $n_d = 1.62$) are utilized. The ocular 14 has an apparent field of 80°.

| Surfaces | Diameters, mm. | Radius of Curvature, mm. | Thicknesses, mm. | Indexes of Refraction, $n_D$ | Abbe Number $\nu$ |
|---|---|---|---|---|---|
| S1 | 31 | −23 | $e_{1c}=2$ | 1.62221 | 36 |
| S2 | | 47.6 | $e_{2c}=21.2$ | 1.69054 | 54 |
| S3 | 42 | −31.97 | $e_{3c}=0.4$ | | |
| S4 | 36 | 19.8 Parabola | $e_{4c}=15.4$ | 1.69054 | 54 |
| S5 | | −36.96 | $e_{5c}=2$ | 1.69402 | 31 |
| S6 | | 17.70 | $e_{6c}=8$ | 1.69054 | 54 |
| S7 | 26 | ∞ | | | |

With an ocular such as this, the astigmatism measurements at the end of the field give the following:

Sagittal focus _____ −2 diopters
Tangential focus _____ +1 diopter

Figure 5:
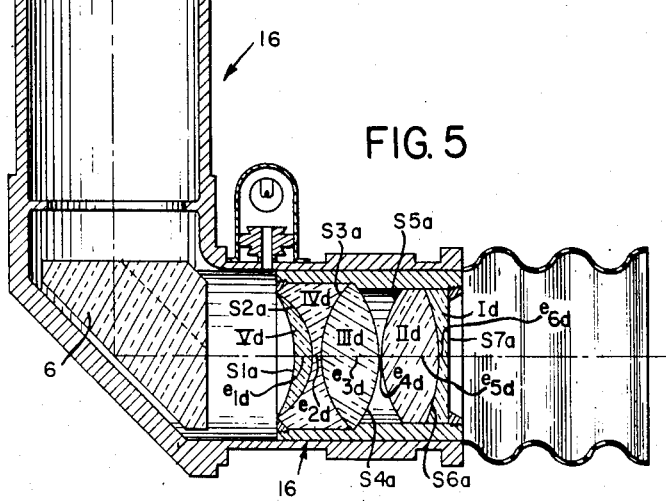
FIGURE 5 is a view in axial cross-section of a telescopic gunsight incorporating an ocular according to the invention.

FIG. 5 gives an example of the application of the ocular of the invention to a telescopic gunsight 16 that can be used, for example, in artillery. This sight also comprises a wide-field ocular 16 according to the invention plus a prism 6 and a biconvex objective lens 7.

The constructional data on the corresponding ocular are the following:

Ocular Focal Length 25 mm.

| Surfaces | Diameters, mm. | Radius of Curvature, mm. | Thicknesses, mm. | Index of Refraction $n_D$ | Abbe Number $\nu$ |
|---|---|---|---|---|---|
| S1a | 40 | −38.8 | | 1.62270 | 60 |
| S2a | | 30.2 | $e_{1d}+e_{2d}+e_{3d}=29$ | 1.62 | 36 |
| S3a | | 38.8 | | 1.62270 | 60 |
| S4a | 48 | −38.8 | $e_{4d}=0.3$ | | |
| S5a | 44 | 31.1 | $e_{5d}=0.03$ Parabola. | 1.80373 | 46 |
| S6a | | −51.5 | $e_{6d}=3$ | 1.72722 | 28 |
| S7a | | ∞ | | | |

Although certain specific embodiments of the invention have been shown and described, it is obvious that many modifications thereof are possible. The invention, therefore, is not to be restricted except insofar as is necessitated by the prior art and by the spirit of the appended claims.

What is claimed:

1. Convergent ocular of wide apparent field comprising at least two groups of lenses, one group constituting an eye glass and the other group constituting a field glass, said field glass comprising at least two lenses and having two external surfaces, the concavity of said surfaces being adapted for simultaneous orientation towards an objective, said field glass comprising cemented lenses whose total thickness is between $0.7f$ and $1.6f$, $f$ being the focal length of the ocular, the face of said field glass remote from said eye glass having a radius of curvature between $1.3f$ and $2f$ and the face of said field glass adjacent said eye glass having a radius of curvature between $1.5f$ and $2.3f$, said eye glass having a surface of rotation facing said field glass with a meridian defined by the following algebraic equations:

$$x = f(y) \text{ when } 0 < y < y^0$$

$$x = f(y) + \epsilon(y - y^0)^\alpha \text{ when } y > y^0$$

$f(y)$ being a continuous function of $y$, $\epsilon$ being a numerical coefficient and $\alpha$ a positive number at least as great as 3, and $f(y)$ being a function of the second degree corresponding to $$x = ay^2$$

$a$ being a constant.

2. Convergent ocular of wide apparent field comprising at least two groups of lenses, one group constituting an eye glass and the other group constituting a field glass, said field glass comprising at least two lenses and having two external surfaces, the concavity of said surfaces being adapted for simultaneous orientation towards an objective, said field glass comprising cemented lenses whose total thickness is between $0.7f$ and $1.6f$, $f$ being the focal length of the ocular, the face of said field glass remote from said eye glass having a radius of curvature between $1.3f$ and $2f$ and the face of said field glass adjacent said eye glass having a radius of curvature between $1.5f$ and $2.3f$, said eye glass having a surface of rotation facing said field glass with a meridian defined by the following algebraic equations:

$$x = f(y) \text{ when } 0 < y < y^0$$

$$x = f(y) + \epsilon(y - y^0)^\alpha \text{ when } y > y^0$$

$f(y)$ being a continuous function of $y$, $\epsilon$ being a numerical coefficient and $\alpha$ a positive number at least as great as 3, and $f(y)$ being a function of the second degree corresponding to $$x = \sqrt{ay^2 + b^2} - b$$

$a$ and $b$ being constants.

3. The combination of a convergent ocular of wide apparent field according to claim 1 with means for observing remote objects comprising a telescopic gun sight.

4. The combination of a convergent ocular of wide apparent field according to claim 1 with means for observing remote objects comprising prism binoculars.

5. The combination of a convergent ocular of wide apparent field according to claim 2 with means for observing remote objects comprising a telescopic gun sight.

6. The combination of a convergent ocular of wide apparent field according to claim 2 with means for observing remote objects comprising prism binoculars.

References Cited in the file of this patent

UNITED STATES PATENTS

| | | |
|---|---|---|
| 1,968,222 | Richter | July 31, 1934 |
| 2,528,468 | Cojan | Oct. 31, 1950 |
| 2,549,158 | Bertele | Apr. 17, 1951 |
| 2,803,996 | Bouwers | Aug. 27, 1957 |

FOREIGN PATENTS

| | | |
|---|---|---|
| 530,506 | Great Britain | Dec. 13, 1940 |